United States Patent [19]

Lichti

[11] Patent Number: 4,788,861

[45] Date of Patent: Dec. 6, 1988

[54] APPARATUS AND CIRCUIT FOR MONITORING THE INK SUPPLY AND INK PRINTER DEVICES

[75] Inventor: Reiner Lichti, Germering, Fed. Rep. of Germany

[73] Assignee: Siemens Aktiengesellschaft, Berlin and Munich, Fed. Rep. of Germany

[21] Appl. No.: 8,756

[22] Filed: Jan. 30, 1987

[30] Foreign Application Priority Data

Feb. 4, 1986 [DE] Fed. Rep. of Germany ....... 3603333

[51] Int. Cl.$^4$ ............................................. G01F 23/24
[52] U.S. Cl. ........................ 73/304 R; 101/DIG. 24; 141/95; 346/140 R; 364/509
[58] Field of Search ............................. 73/304 R, 314; 346/140 R; 340/620

[56] References Cited

U.S. PATENT DOCUMENTS

| | | |
|---|---|---|
| 3,976,860 | 8/1976 | Gerstenmeier et al. |
| 4,196,625 | 4/1980 | Kern ..................... 73/304 R |
| 4,284,343 | 8/1981 | Junghanns ................. 73/304 R X |
| 4,470,296 | 9/1984 | Kobayashi et al. ......... 73/304 R X |
| 4,550,261 | 10/1985 | Hormel et al. ............ 73/304 R X |
| 4,590,413 | 5/1986 | Gritter et al. ............. 364/811 X |
| 4,602,344 | 7/1986 | Ferretti et al. ............ 364/509 |
| 4,610,202 | 9/1986 | Ebinuma et al. .......... 73/304 R X |
| 4,635,043 | 1/1987 | Kronenberg et al. ...... 73/313 X |

FOREIGN PATENT DOCUMENTS 3322825 1/1985 Fed. Rep. of Germany.
2072851 10/1981 United Kingdom.

Primary Examiner—Daniel M. Yasich

[57] ABSTRACT

Apparatus for monitoring supply of electrically conductive writing fluid in a reservoir for an ink printing device which has three electrodes with one pair of the electrodes mounted in a region of the reservoir which is constantly moistened by the writing fluid and provides a first signal which produces a fluid comparison resistance. An additional electrode together with one of the pair of electrodes produces a signal which indicates the change of resistance as a function of the fluid level of the fluid. A control electronics component receives the first and second signals and supplies an output to a shut-off device. A generator and an inverter which receives an input from the generator supply pulses to two of the electrodes.

13 Claims, 1 Drawing Sheet

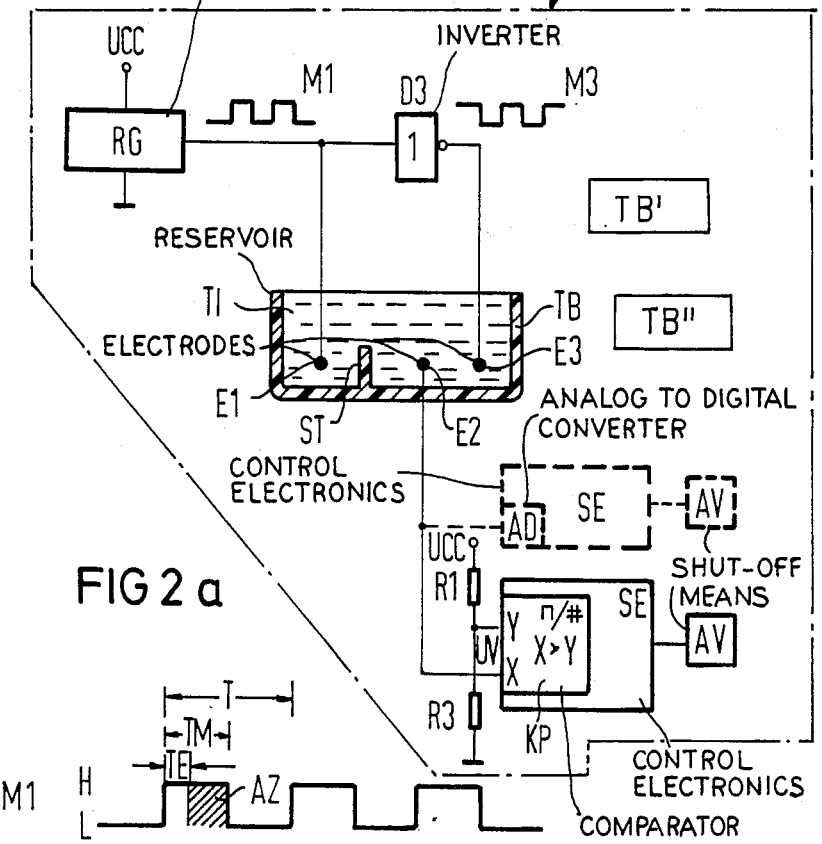

APPARATUS AND CIRCUIT FOR MONITORING THE INK SUPPLY AND INK PRINTER DEVICES

BACKGROUND OF THE INVENTION

1. Field of the Invention

This invention relates in general to apparatus and circuits for monitoring the supply of electrically conductive writing fluid in a reservoir for ink printer devices.

2. Description of the Prior Art

In printer devices that use ink as the writing medium, the write head generally moves along a recording medium driven by a motor means and is supplied with writing fluid from an ink reservoir through a supply line. When the ink reservoir is integrated in the write head, then the reservoir moves with the write head and visual monitoring of the ink supply and the container is not possible. A constant monitoring of the ink supply, however, is necessary for a reliable functioning of the ink printer especially for printer devices in equipment such as telex and data traffic equipment.

U.S. Pat. No. 4,196,625 discloses an apparatus for monitoring the supply of electrically conductive writing fluid for ink printer devices. In this apparatus, the conductivity of the ink is utilized for measuring the supply. For this purpose, three measuring electrodes are introduced into two separate cavities or troughs of an ink reservoir which are separated by a web and the electrical resistance between the electrodes is measured using a resistance bridge. Two of the electrodes are mounted in the same cavity of the reservoir and serve for the acquisition of a fluid associated comparison resistance and two of the electrodes which are situated in different cavities serve for the acquisition of the resistance changing value which depends on the level of the fluid. So as to avoid decomposition of the ink by electrolysis, rectangular pulses of a pulse generator are supplied to a resistance bridge through a capacitor as zero symmetrical alternating voltage such that one branch or arm is composed of the ink resistances to be acquired and the other branch or arm is composed of fixed resistors and the output signal is forwarded to an evaluation circuit and to a circuit component having a threshold which produces an output signal for a display means when a comparison value corresponding to a defined supply volume goes below the defined volume.

The monitoring of the ink supply using an alternating current bridge circuit and subsequent mean value formation is relatively complex and an additional measurement of the "impending end of ink" increases the circuit outlay considerably.

SUMMARY OF THE INVENTION

It is an object of the present invention to provide apparatus and circuit for monitoring the writing fluid supply for ink printer devices or similar printer devices which use electrically conductive writing fluid which includes a simple and reliable circuit and which can be inexpensively manufactured.

A feature of the present invention provides for apparatus for monitoring the supply of electrically conductive writing fluid TI in a reservoir TB for ink printer devices or similar printer devices which uses three electrodes for resistance measurements. One pair of the electrodes E2 and E3 is arranged in a region of the reservoir TB where they are constantly moistened by writing fluid TI and the output of these electrodes serve for providing a fluid associated comparison resistance. An additional electrode E1 with one of the other electrodes of said electrode pair, either E2 or E3, serves for acquiring the resistance changing value depending upon the fluid level. These measured values are supplied to an evaluation arrangement which drives a shutoff means AV dependent on the level of the writing fluid TI. The measurement occurs using DC voltage pulses M1 and M3 and the further electrode E1 receives a measuring pulse M1 and the corresponding electrode of the electrode pair E2 and E3 receives a compensation pulse M3 of similar amplitude and having an inverted polarity. As a result a voltage U2 indicative of the level of the fluid TI in reservoir TB can be obtained at the other electrode E2 of the electrode pair E2 and E3.

One advantage of the invention is that the filling level of the reservoir can be identified in an especially simple way by employing a short DC voltage pulse for voltage measurement at the electrodes. The chronological mean value of the voltage between the electrodes is zero as a result of applying DC pulses of like duration and amplitude such that the "high level" is adjacent to one electrode during the measuring operation and the "low" level is adjacent the other electrode and the inverted levels are respectively subsequently adjacent the electrodes. Decomposition of the ink and of the electrodes due to electrolysis is thus avoided. The voltage measurement can occur both during the "high" level as well as during the "low" level.

Since the measured values for the identification of the fluid level of the ink reservoir are subject to static and dynamic fluctuations, a mean value formation is executed based on a plurality of successive measured values so that a reliable recognition of the end of ink is assured.

FIG. 1 shows that the apparatus for monitoring the writing fluid in part of an ink printing device which may have other reservoirs TB' and TB" which also have monitoring systems.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 illustrates the circuit diagram for the apparatus for monitoring the fluid level of ink reservoirs according to the invention; and FIGS. 2a and 2b comprise plots of the time curves of the DC voltage pulses supplied to the electrodes of the ink reservoir.

DESCRIPTION OF THE PREFERRED EMBODIMENTS

An ink printer device, not illustrated in the drawing, contains a write head which is moveable along a recording medium and the write head is supplied by way of a supply line from an ink reservoir TB illustrated in FIG. 1. The ink reservoir TB contains three electrodes E1, E2 and E3 and the structure of the reservoir TB as well as the arrangements of the electrodes E1, E2 and E3 can be as shown and described in U.S. Pat. No. 4,196,625. The electrodes E1, E2 and E3 are mounted in the floor of the reservoir TB and serve for recognizing the supply of writing fluid TI in the reservoir TB. The resistance of the writing fluid TI occurring between the electrodes E2 and E3 produces the fluid associated comparison resistance changes with temperature and the composition of the writing fluid TI in the same manner as the measured resistance measured between the electrodes E1 and E2. Assuming a full ink reservoir TB, the resistance between the electrodes E1 and E2 is roughly the same as the resistance between the electrodes E2 and E3. When the fluid level drops, then both resistances rise. However, the rise in the value of the resistance is only very slight at first and the voltage U2 at the electrode E2 changes only a small amount at first. It is only when there is a noticeable drop in the ink level that the conductive cross-section between the electrodes E1 and E2 is greatly constricted by the intervening web ST which divides the reservoir into two different portions in the lower portion of the reservoir. The resistance between the electrodes E1 and E2 then increases more rapidly than the resistance between the electrodes E2 and E3 so that the voltage E2 at the electrode U2 changes.

So as to measure the voltage U2, a signal M1 produced by a square wave generator RG and having, for example, a level of H and a pulse to absence of pulse ratio of 1:1 is applied to the electrode E1 as shown. The signal M1 is also supplied to an inverter D3 and is inverted and is then supplied to the electrode E3 as a compensation signal M3.

As a result, the chronological mean value of the voltage at the electrodes becomes zero. The signal M1 carries "high" level for the duration of the measurement and the compensation signal M3 carries "low" level. The voltage U2 at the electrode E2 is dependent on the level of fluid in the reservoir TB is compared with to a comparison voltage, UV using a comparator KP which is contained in the control electronics SE. The comparison voltage UV is derived from a supply voltage UCC using a voltage divider comprising the resistors R1 and R3. As long as there is sufficient writing fluid TI in the reservoir TB, the voltage U2 at the electrode E2 will be higher than the comparison voltage UV. The output voltage of the comparator KP thus has a "high" level and a shut-off means AV which is connected to the output of the comparator KP is not activated.

However, when there is a drop in the level of the fluid, the voltage U2 falls below the comparison voltage UV and this level can be set by selecting suitable values for the resistors R1 and R3 and corresponding to a defined minimum fluid level in the reservoir TB, then the output voltage of the comparator KP will have a "low" level which causes the shut-off means AV to signal that the ink supply has run out. The signalling of the shut-off means AV may be optically and/or acoustically and will prevent the printing of characters if the apparatus is in the continued write mode until the reservoir is filled.

For a more detailed description of the shut-off device and its operation, reference can be made to U.S. Pat. No. 4,196,625 which is hereby incorporated by reference.

Both the impending end of ink as well as the end of the ink can be indicated by selecting the comparison voltage UV. Since the voltage U2 at the electrode E2, in other words, the measured value is subject to both static fluctuations when the ink reservoir TB is at rest and dynamic fluctuations when the ink reservoir TB is moving during the write mode, the end of ink recognition has a certain lack of sharpness due to the fluctuations. Thus, the typical voltage difference $\Delta$ U2 between the voltage measured for a full ink reservoir TB and the voltage measured for an empty reservoir TB is about the order of magnitude of about 270 mV. The dynamic fluctuations of the measured value during carriage movement, on the other hand, can typically amount to more than 800 mV.

Particularly, with an ink reservoir which is on the verge of becoming empty, the measured value can fluctuate between "full" and "empty". So as to obtain a reliable indication of end of ink recognition, a mean value formed by a plurality of measurements is carried out. For this purpose, a plurality of n interrogations (output signal of the comparator KP) are stored in the control electronics SE. The control electronics SE may be a type uPD 7810 available from the NEC Company. This unit includes an analog to digital converter. The comparator KP can be a module type LM393 available from the Texas Instrument Company. When given n interrogations, a plurality $m \leq /2$ corresponds to the measured value "low" level, then this signal is interpreted as "end of ink". Assuming a plurality of measured values $m > n/2$ carrying "high" level is correspondingly interpreted as "ink present".

Instead of being done by the comparator KP, the evaluation of the voltage U2 can also be done with an analog to digital converter AD of the control electronics for the printer device and this is shown in broken line illustration in FIG. 1.

The n measured values of the voltage U2 are digitally stored in the controlled electronics SE after the A/D conversion.

So as to obtain a reliable end of ink recognition in this case as well, a mean value formation is also carried out, but now with the assistance of the control electronics SE. For this purpose, the measured value Xn is averaged with the old mean value $X_n' = (X_m + X_n)/2$. This new mean value Xn' is then averaged again with the old mean value $X_n'' = (X_m + X_n')/2$ and so forth. This procedure is repeated a number of times so that every new measured value has only a slight influence on the mean value.

So as to alway obtain an indication of the current fluid level TI in the ink reservoir TB, the end of ink interrogation is accomplished by measuring the voltage U2 during all possible operating statuses of the printer device.

The measured values are obtained both after the initialization after changing the reservoir TB, in standby operation, before beginning to write as well as during the write mode. During writing, the measurement must be done at a time when the measurement is not significantly influenced by dynamic fluctuations of the measured value U2 and/or by cross-talk of drive pulses for the write unit. This measurement is thus carried out after writing the last column of a line and the mean value is formed according to the method described above.

A possible interrogation time AZ is shown as shaded in FIG. 2a for the measuring signal M1. The measuring signal M1 carries "high" potental during the interval TM and the compensation signal M3 carries "low" potential. The pulse to absence of pulse ratio for both pulses is thus one. After a certain transient interval TE, the measured value is stable and can be interrogated. So as to avoid a decomposition of the ink due to electrolysis, the two pulses M1 and M3 have the same duration TM and TK and identical amplitudes so that the chronological mean value over a period is zero. Since in practice, however, the output from the square wave generator RG or, respectively of the inverter D3 can have different residual voltages this being expressed in slightly different amplitudes of the signals M1 and M3 and, thus, in a voltage at the electrodes which differs from zero, the duration TM and TK of the pulses M1 and M3 is restricted to a brief time, as for example, 100 µs.

FIG. 2b illustrates a further pulse sequence having a pulse-to-absence of pulse ratio 1 wherein the compensation pulse M3 is not applied to the electrode E3 until after a certain time lapse of T3 following the measuring pulse M1. Here also, the pulses M1 and M3 have opposite operational signs during the interrogation time period AZ and the chronological mean value over a period T is zero. The period duration T of the DC voltage pulses in the write mode thereby corresponds to the time required for printing a line.

Typical values for the pulse sequences are:
Measuring pulses, compensation pulses: TM=TK=50 µsec
Spacing/measuring/compensation pulse: T3=10 µsec
The response time: TE=2 µsec
Period duration, print mode: T=line
Period duration, initialization: T=1 msec.

For monitoring the ink supply in printer devices that use multi-color printing, it is necessary to monitor all supply reservoirs to determine the level of the ink in the reservoir. A separate measured value is acquired and the evaluation circuit is utilized for every color and the outputs of the comparators are combined to form a single "end of ink message".

Although the invention has been described with respect to preferred embodiments, it is not to be so limited as changes and modifications can be made which are within the full intended scope of the invention as defined by the appended claims.

I claim as my invention:

1. An apparatus for monitoring the supply of electrically conductive writing fluid (I) in a reservoir (TB) for ink printer devices comprising, three electrodes (E1, E2, E3) for resistance measurements, one pair of electrodes (E2, E3) is mounted in a region of said reservoir (TB) which is constantly moistened by said writing fluid (TI) and provides a first signal which indicates a fluid-associated comparison resistance, and a further electrode (E1) together with one of said pair of electrodes (E2, E3) provides a second signal which indicates the change of resistance therein as a function of the fluid level of said fluid (TI), a control electronics means (SE) receiving said first and second signals, a cutoff means (AV) connected to said control electronics means (SE) to indicate when the level of said writing fluid (TI) falls below a minimum level, said first and second signals is produced with DC voltage pulses produced by a generator (RG) and an inverter (I) which produces pulses (M1) and inverted pulses (M3) which have the same amplitude and said further electrode (E1) receives said DC voltage pulses (M1) and one of said pair of electrodes receives said inverted pulses (M3) which are inverted relative to said pulse (MI) and a voltage (U2) indicative of the fluid level in said reservoir (TB) occurs at the other one of said pair of electrode (E2) of said pair electrodes (E2, E3).

2. An apparatus according to claim 1 wherein said measuring pulse (M1) at said electrode (E1) has a "high" level for the duration of the voltage measurement (U2) and said compensation pulse (M3) at said electrode (E3) has a "low" level.

3. An apparatus according to claim 1, wherein said measuring pulse (M1) at said electrode (E1) has a "low" level for the duration of the voltage measurement (U2) and said compensation pulse (M3) at said electrode (E3) has a "high" level.

4. An apparatus according to claim 1 wherein the duration (TM) of said measuring pulse (M1) is equal to the duration (TK) of said compensation pulse (M3).

5. An apparatus according to claims 1 or 2 or 3 or 4 wherein said compensation pulse (M3) falls within the period (T) of said measuring pulse (M1).

6. An apparatus according to claims 1 or 2 or 3 or 4 wherein said apparatus monitors a plurality of reservoirs (TB) for differently colored writing fluids (TI), and separate control electronics (SE) are provided for each writing fluid (TI) and the outputs of said control electronics (SE) are combined and are supplied to shut-off means means (AV).

7. An apparatus according to claim 2, wherein said voltage (U2) is compared with a comparator (KP) in said control electronics (SE) to a comparison voltage (UV) and said display means (AV) is activated when said voltage (U2) falls below said comparison voltage (UV).

8. An apparatus according to claim 3, wherein said voltage (U2) is compared with a comparator (KP) in said control electronics (SE) to a comparison voltage (UV) and said display means (AV) is activated when said voltage (U2) is above said comparison voltage (UV).

9. An apparatus according to claim 3, wherein for evaluating the fluid level of said ink reservoir (TB), said voltage (U2) is supplied to an analog input of an analog-to-digital converter (AD) in said control electronics (SE) which activates said shutoff means (AV) when said voltage (U2) exceeds a preset minimum value.

10. An apparatus according to claim 9, wherein during writing operation, said measured value (U2) is interrogated once per line after the last column of a line has been written.

11. An apparatus according to claim 1, wherein a mean value is formed in said control electronics (SE) from a plurality of successive measurements of said voltage (U2) and the amplitude of said means value is used as a criterion for the activation of a display means (AV) to indicate the level of fluid in said ink reservoir (TB).

12. An apparatus according to claim 1 wherein the interrogation of said measured values (U2) occurs by applying said pulses (M1, M3), after said ink reservoir (TB) is changed and during writing operation.

13. An apparatus according to claim 1, wherein for the evaluation of the fluid level in said reservoir (TB), said voltage (U2) is supplied to an analog input of an analog-to-digital converter (AD) in said control electronics (SE) which activates said shutoff means (AV) when said voltage (U2) go below a preset minimum value.

* * * * *